(12) United States Patent
Shindler

(10) Patent No.: US 7,798,635 B1
(45) Date of Patent: Sep. 21, 2010

(54) HELMET VISION IMPROVEMENT ASSEMBLY AND METHOD

(76) Inventor: David Shindler, 26 Sandwood Road, Glasgow (GB) G52 2PP ( * ) Notice: Subject to any disclaimer, the term of this patent is extended or adjusted under 35 U.S.C. 154(b) by 288 days.

(21) Appl. No.: 12/033,535

(22) Filed: Feb. 19, 2008

(51) Int. Cl.
*G02C 9/00* (2006.01)
(52) U.S. Cl. ............................................. 351/47; 2/424
(58) Field of Classification Search ................. 351/155, 351/47, 57, 159, 169, 170, 172, 177; 2/424, 2/10, 422, 452, 453, 209, 13; D29/122
See application file for complete search history.

(56) References Cited

U.S. PATENT DOCUMENTS

| 3,774,239 | A | 11/1973 | Kotzar |
| 5,163,185 | A | 11/1992 | Hodnett |
| 5,416,536 | A | 5/1995 | Tee, Jr. |
| D380,873 | S | 7/1997 | Reuber |
| 5,694,650 | A | 12/1997 | Hong |
| 5,845,342 | A | 12/1998 | Park |
| 6,006,366 | A | 12/1999 | Vondrak |
| 6,170,952 | B1 * | 1/2001 | La Haye et al. ............. 351/168 |
| 6,732,380 | B1 * | 5/2004 | Lee ................................ 2/424 |
| D498,563 | S | 11/2004 | Fournier et al. |
| 6,892,393 | B1 | 5/2005 | Provost et al. |
| 7,036,929 | B1 * | 5/2006 | Harvey ........................ 351/159 |

* cited by examiner

*Primary Examiner*—Hung X Dang

(57) ABSTRACT

A helmet vision improvement assembly includes a helmet that has a viewing aperture extending through a front side of the helmet. A shield is coupled to the helmet and is positionable over the aperture. The shield is substantially transparent. A lens includes a prescription to match an eyeglass prescription of a wearer of the helmet. The lens is attached to the inner surface of the shield to position the lens in a field of view of the wearer.

6 Claims, 3 Drawing Sheets

HELMET VISION IMPROVEMENT ASSEMBLY AND METHOD

BACKGROUND OF THE INVENTION

Field of the Invention

The present invention relates to vision improvement devices and more particularly pertains to a new vision improvement device for allowing a motorcycle rider to wear a helmet that corrects for eye vision problems of the rider.

SUMMARY OF THE INVENTION

The present invention meets the objectives presented above by generally comprising a helmet that has a viewing aperture extending through a front side of the helmet. A shield is coupled to the helmet and is positionable over the aperture. The shield is substantially transparent. A lens includes a prescription to match an eyeglass prescription of a wearer of the helmet. The lens is attached to the inner surface of the shield to position the lens in a field of view of the wearer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
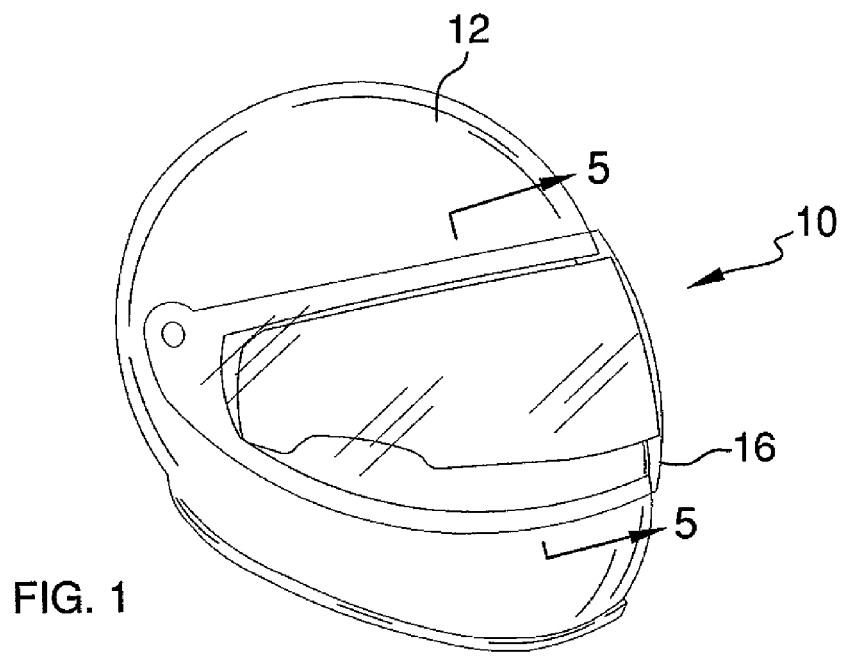
FIG. 1 is a front perspective view of a helmet vision improvement assembly and method according to the present invention.
Figure 2:
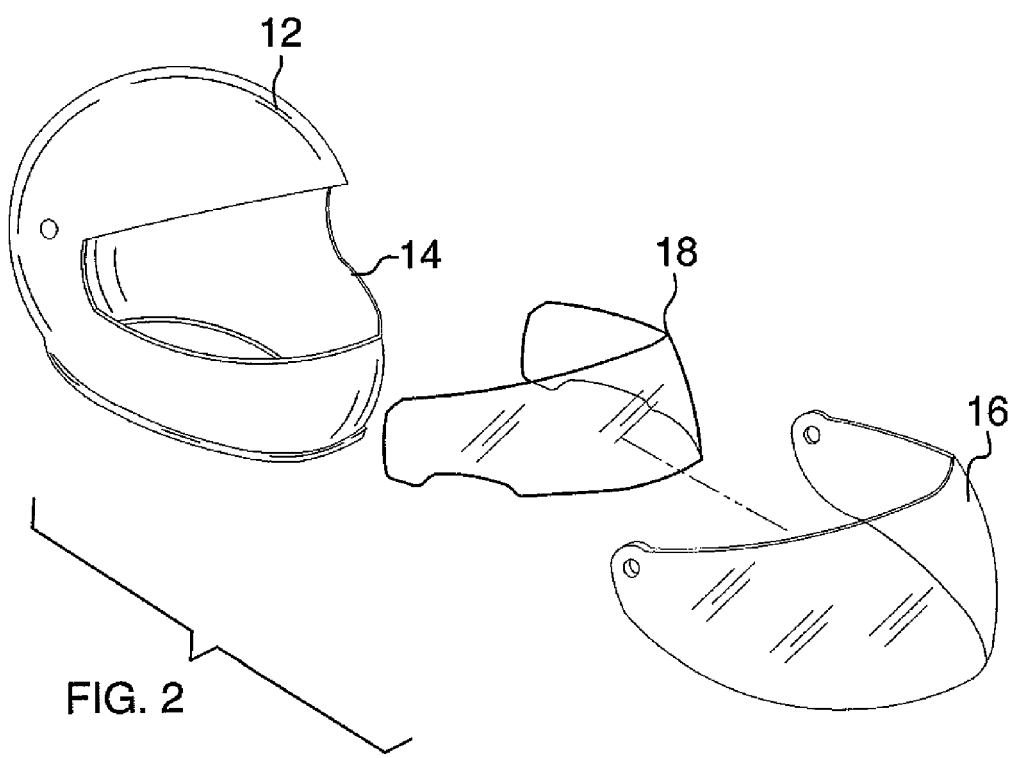
FIG. 2 is a front perspective expanded view of the present invention.
Figure 3:
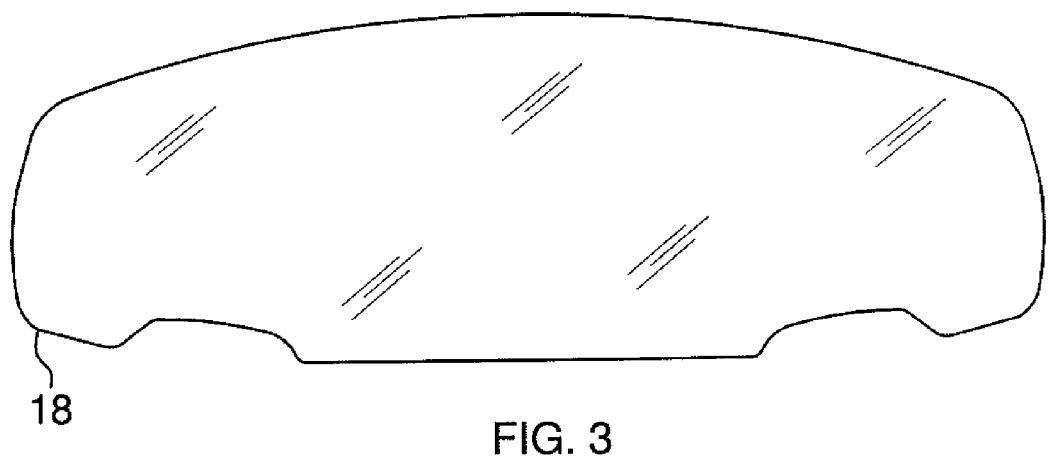
FIG. 3 is a front view of a lens the present invention.
Figure 4:
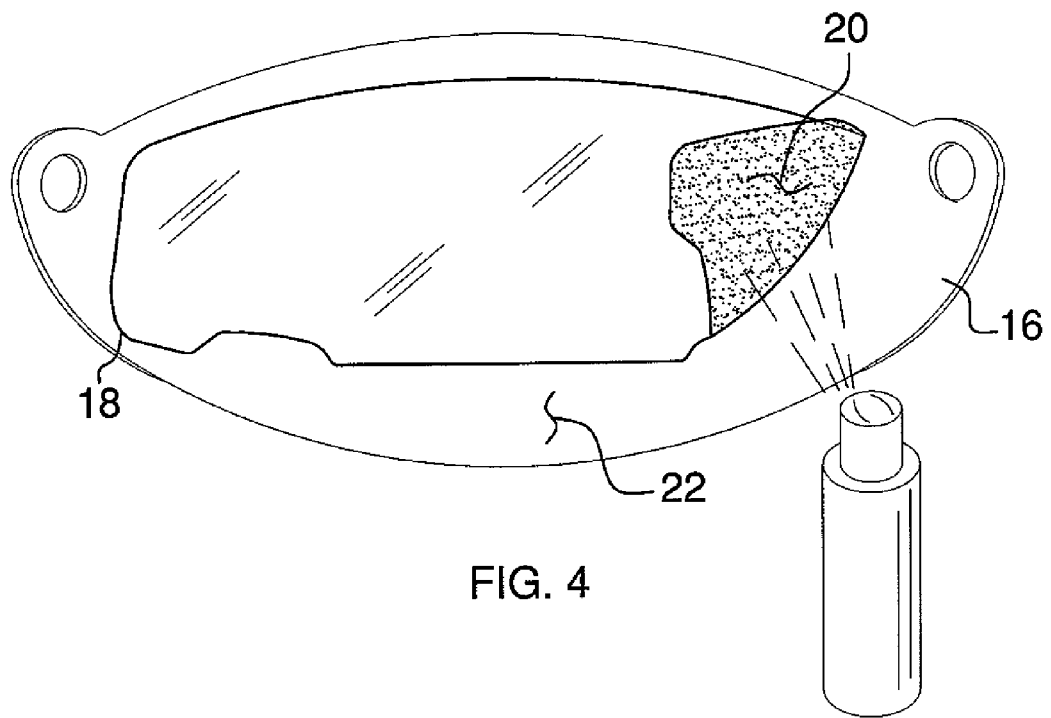
FIG. 4 is a front view of the present invention showing the attachment of the lens to a shield.
Figure 5:
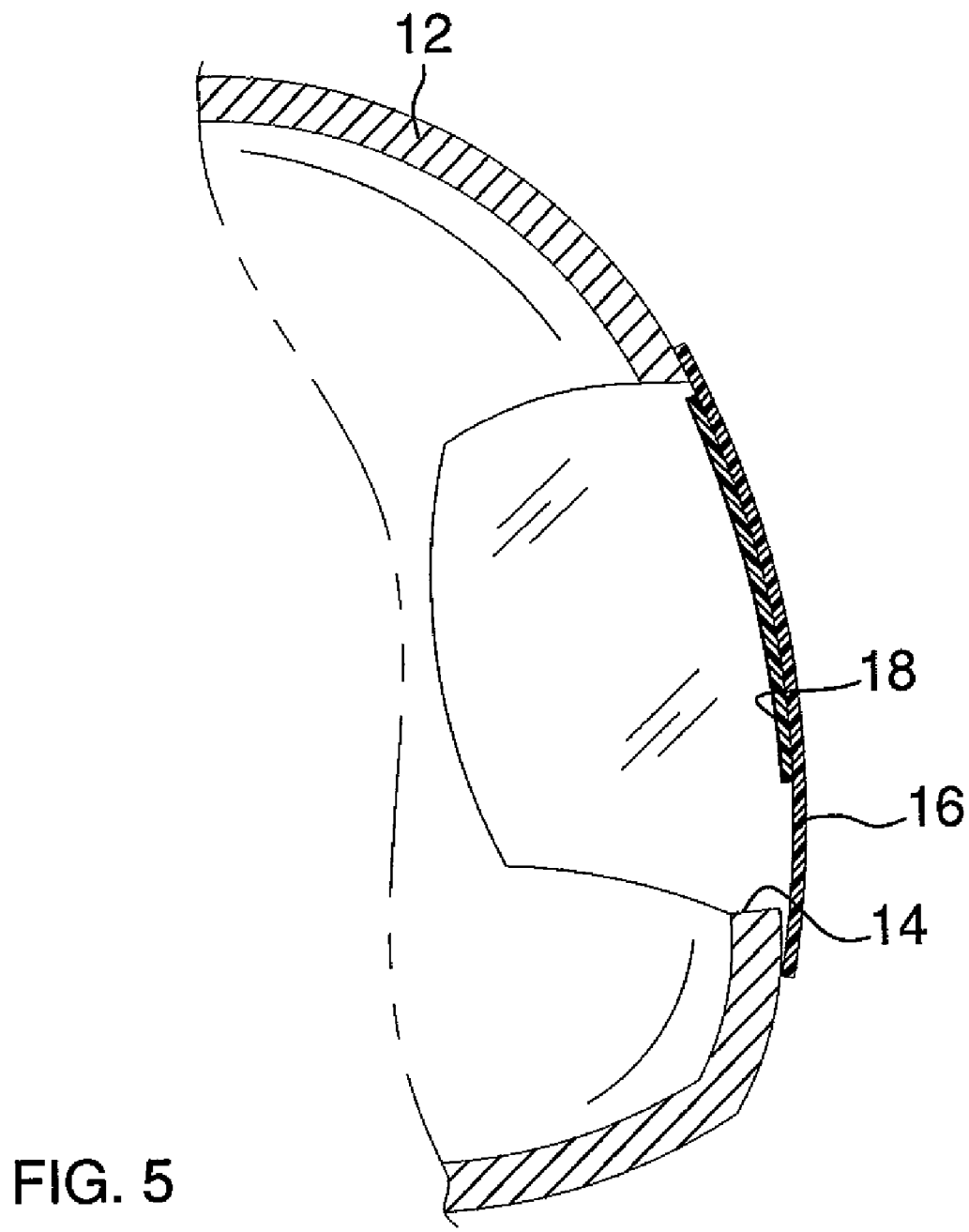
FIG. 5 is a cross-sectional view taken along line 5-5 of FIG. 5 of the present invention.

With reference now to the drawings, and in particular to FIGS. 1 through 5 thereof, a new vision improvement device embodying the principles and concepts of the present invention and generally designated by the reference numeral 10 will be described.

As best illustrated in FIGS. 1 through 5, the helmet vision improvement assembly 10 and method generally comprises providing conventional a helmet 12 that has a viewing aperture 14 extending through a front side of the helmet 12. A shield 16 coupled to the helmet 12 is positionable over the aperture 14. The shield 16 is substantially transparent. The term substantially is meant to mean that while the shield 16 may be nearly completely transparent, that it may also be tinted or colored to allow sufficient light therethrough for viewing, but which may block a certain amount or certain types of light.

A lens 18 is provided which has a shape and size to cover at least 40% of the viewing aperture 14. The lens 18 is to be shaped to match an eyeglass prescription for a wearer of the helmet 12. The lens 18 may include a single large lens or may include a pair of lenses positioned within a panel. The lens 18 may comprise a flexible member to allow it to be easily warped to match the shield 16. Because of this, the lens 18, when it is being shaped to the correct prescription, must also be shaped to compensate for the curvature of the shield 16 and focal length from the shield 16 to the eye of a wearer of the helmet 12.

A transparent adhesive 20 is positioned on the lens and the lens 18 and the lens attached to an inside surface 22 of the shield 16. The lens 18 is positioned so that the lens 18 is in a field of view of the wearer when the shield 16 is positioned over the viewing aperture 14.

In use, a person who has a glasses prescription will have the lens 18 made to the user's prescriptive needs. The lens 18 will then be attached to the shield 16 as described above and as shown in FIG. 5. This will allow the user to forgo wearing glasses while riding a motorcycle as the lens 18 will provide the necessary vision correction. As mentioned, the lens 18 may include two lenses, each with a different prescription to correspond with each eye, which are mounted within a single panel attached to the shield. It should also be understood that the lens 18 may itself include a plurality of discrete contours so that one lens actually includes a plurality prescriptions. This would allow one half of the lens 18 to correspond to one eye and the other half of the lens 18 to correspond to the other eye. Further, the lens 18 may include bifocal aspects as well.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of improving vision when wearing a helmet, said method comprising:
   providing a helmet having a viewing aperture extending through a front side of the helmet;
   providing a shield coupled to said helmet and being positionable over said aperture, said shield being substantially transparent;
   providing a lens;
   shaping said lens to match an eyeglass prescription for a wearer of said helmet; and
   attaching said lens to an inner surface of said shield to position said lens in a field of view of the wearer when the shield is positioned over said viewing aperture.

2. The method according to claim 1, wherein said lens has a shape and size to cover at least 40% of said viewing aperture.

3. A method of improving vision when wearing a helmet, said method comprising:
- providing a helmet having a viewing aperture extending through a front side of the helmet;
- providing a shield coupled to said helmet and being positionable over said aperture, said shield being substantially transparent;
- providing a lens, said lens having a shape and size to cover at least 40% of said viewing aperture;
- shaping said lens to match an eyeglass prescription for a wearer of said helmet;
- providing a transparent adhesive;
- positioning said adhesive on said lens; and
- attaching said lens to an inner surface of said shield with said adhesive and positioning said lens such that said lens is in a field of view of the wearer when the shield is positioned over said viewing aperture.

4. A helmet vision improving apparatus comprising:
- a helmet having a viewing aperture extending through a front side of the helmet;
- a shield coupled to said helmet and being positionable over said aperture, said shield being substantially transparent; and
- a lens including a prescription to match a an eyeglass prescription of a wearer of said helmet, said lens being attached to said inner surface of said shield to position said lens in a field of view of the wearer.

5. The apparatus according to claim 4, wherein said lens has a shape and size to cover at least 40% of said viewing aperture.

6. The apparatus according to claim 5, wherein a transparent adhesive is positioned on said lens and attaches said lens to said shield.

* * * * *